United States Patent
Salim et al.

[11] Patent Number: 6,103,212
[45] Date of Patent: Aug. 15, 2000

[54] METHOD FOR MAKING UHP TUNGSTEN HEXAFLUORIDE

[75] Inventors: Sateria Salim, Amherst; Arthur Edward Holmer, Lewiston, both of N.Y.

[73] Assignee: Praxair Technology, Inc., Danbury, Conn.

[21] Appl. No.: 09/358,550

[22] Filed: Jul. 22, 1999

[51] Int. Cl.[7] .................................................. C01B 9/08
[52] U.S. Cl. .......................... 423/489; 423/240 S; 95/263
[58] Field of Search ............................ 423/489, 240 R, 423/240 S; 95/263

[56] References Cited

U.S. PATENT DOCUMENTS

| | | | |
|---|---|---|---|
| 3,711,596 | 1/1973 | Hartig | 423/483 |
| 3,798,875 | 3/1974 | Morris | 55/22 |
| 3,995,011 | 11/1976 | Jache et al. | 423/489 |
| 5,324,498 | 6/1994 | Streusand et al. | 423/489 |
| 5,328,668 | 7/1994 | Sabacky et al. | 422/235 |
| 5,348,723 | 9/1994 | Sabacky et al. | 423/489 |

*Primary Examiner*—Tom Dunn
*Assistant Examiner*—Christina Ildebrando
*Attorney, Agent, or Firm*—Bernard Lau

[57] ABSTRACT

This invention is directed to a method for producing UHP tungsten hexafluoride by introducing an amount of crude tungsten hexafluoride to an evaporating process for separation into an amount of tungsten hexafluoride-containing volatile impurities and an amount of non-volatile metallic impurities; passing the amount of tungsten hexafluoride-containing volatile residue to a gas phase adsorption process for separation into an amount of semi-crude tungsten hexafluoride product and an amount of hydrogen fluoride non-volatile residue; and passing the amount of semi-crude tungsten hexafluoride product to a sparging system using UHP helium for separation into a non-volatile UHP tungsten hexafluoride product.

20 Claims, 2 Drawing Sheets

METHOD FOR MAKING UHP TUNGSTEN HEXAFLUORIDE

FIELD OF THE INVENTION

This invention is generally related to a method for purifying a gas. More specifically, this invention is related to a method for producing UHP (ultra high purity) grade tungsten hexafluoride by a purification process.

BACKGROUND OF THE INVENTION

Tungsten hexafluoride is the source gas used in the chemical vapor deposition of tungsten for microelectronics manufacturing process. In these applications, UHP tungsten hexafluoride is needed to assure reliability of the semiconductor manufacturing processes.

Various attempts have been made in the manufacture of UHP tungsten hexafluoride. Tungsten hexafluoride may be produced by the reaction of high purity tungsten metal with fluorine. However, there are difficulties in controlling the impurities in the fluorine source which often results in high level of gaseous impurities in the 100 to 1000 ppm range. The reaction between fluorine gas with trace moisture in the wall of the gas handling system which results from the manufacturing process may produce additional hydrogen fluoride impurities. Moreover, the presence of impurities in the source tungsten metal may result in the incorporation of low volatile metallic impurities in the final product. To achieve a UHP grade tungsten hexafluoride product, a more reliable and economical purification process is needed. More specifically, it is desired to devise a comparatively simpler method for producing a UHP grade tungsten hexafluoride of 99.9999% purity from a crude grade tungsten hexafluoride of about 99% purity than presently available in the art.

Certain attempts have been made to purify tungsten hexafluoride. U.S. Pat. No. 5,324,498 discloses a purification process for tungsten hexafluoride which involves a) evaporation of tungsten hexafluoride to remove non-volatile resides, b) condensing the evaporated product, c) freezing the condensed tungsten hexafluoride to solid form, d) evacuating the headspace to remove volatile impurities, e) thawing the solid and heating the tungsten hexafluoride to a temperature above its boiling point at a reduced pressure, f) evacuating the headspace to remove volatile impurities from the headspace, and g) repeating the thermal cycles in steps c to f at least once. The process in the '498 patent has a marginal success for removing volatile impurities such as nitrogen and oxygen, and is not effective for removing hydrogen fluoride in the tungsten hexafluoride due to the similarity in the boiling point temperature. Since the process requires several repeated thermal cycles, the process is very time consuming.

U.S. Pat. Nos. 5,328,668 and 5,348,723 disclose synthesis processes for producing semiconductor grade tungsten hexafluoride. These processes use evaporation as the means to remove non-volatile impurities from the product and does not provide any means for removing other metallic impurities as well as a methods for reducing the hydrogen fluoride level.

U.S. Pat. No. 3,995,011 discloses the production of tungsten hexafluoride from tungsten, halogen and hydrogen fluoride. However, there is no teaching or suggestion for the purification of tungsten hexafluoride.

SUMMARY OF THE INVENTION

One aspect of this invention is directed to a method for producing UHP tungsten hexafluoride comprising the steps of a) introducing an amount of crude tungsten hexafluoride to an evaporating process for separation into an amount of tungsten hexafluoride-containing volatile impurities and an amount of non-volatile metallic impurities; b) passing the amount of tungsten hexafluoride-containing volatile impurities due to a gas phase adsorption process for separation into an amount of semi-crude tungsten hexafluoride product and an amount of hydrogen fluoride non-volatile residue; and c) passing the amount of semi-crude tungsten hexafluoride product to a sparging system using UHP helium for separation into a non-volatile UHP tungsten hexafluoride product.

Another aspect of this invention is directed to a method for removing hydrogen fluoride from tungsten hexafluoride comprising the steps of passing an amount of tungsten hexafluoride to a gas phase adsorption process for separation into an amount of semi-crude tungsten hexafluoride product and an amount of hydrogen fluoride as adsorbed residue and passing the amount of semi-crude tungsten hexafluoride product to a UHP gas sparging system for separation into a non-volatile UHP tungsten hexafluoride product. The UHP gas sparging system may use inert UHP gases such as argon, nitrogen, helium, krypton and xenon.

Generally, the crude tungsten hexafluoride is about 99+% pure tungsten hexafluoride and contains greater than about 1 ppmv hydrogen fluoride. The amount of tungsten hexafluoride containing volatile impurities is also separated into an amount of non-volatile silicon fluoride impurities. The sparging system is carried out at a temperature of greater than about 3° C., and at a pressure of greater than about 0.5 atm, and uses a pulse purge sequence. The gas phase adsorption process uses a sodium fluoride adsorption bed or a potassium fluoride adsorption bed.

As used herein, the term "crude tungsten hexafluoride" shall mean tungsten hexafluoride gas containing a concentration of greater than 1 ppmv hydrogen fluoride, 0.5 ppmv volatile species and/or 100 ppbw non-metallic species impurities.

DETAILED DESCRIPTION OF THE DRAWINGS

Figure 1:
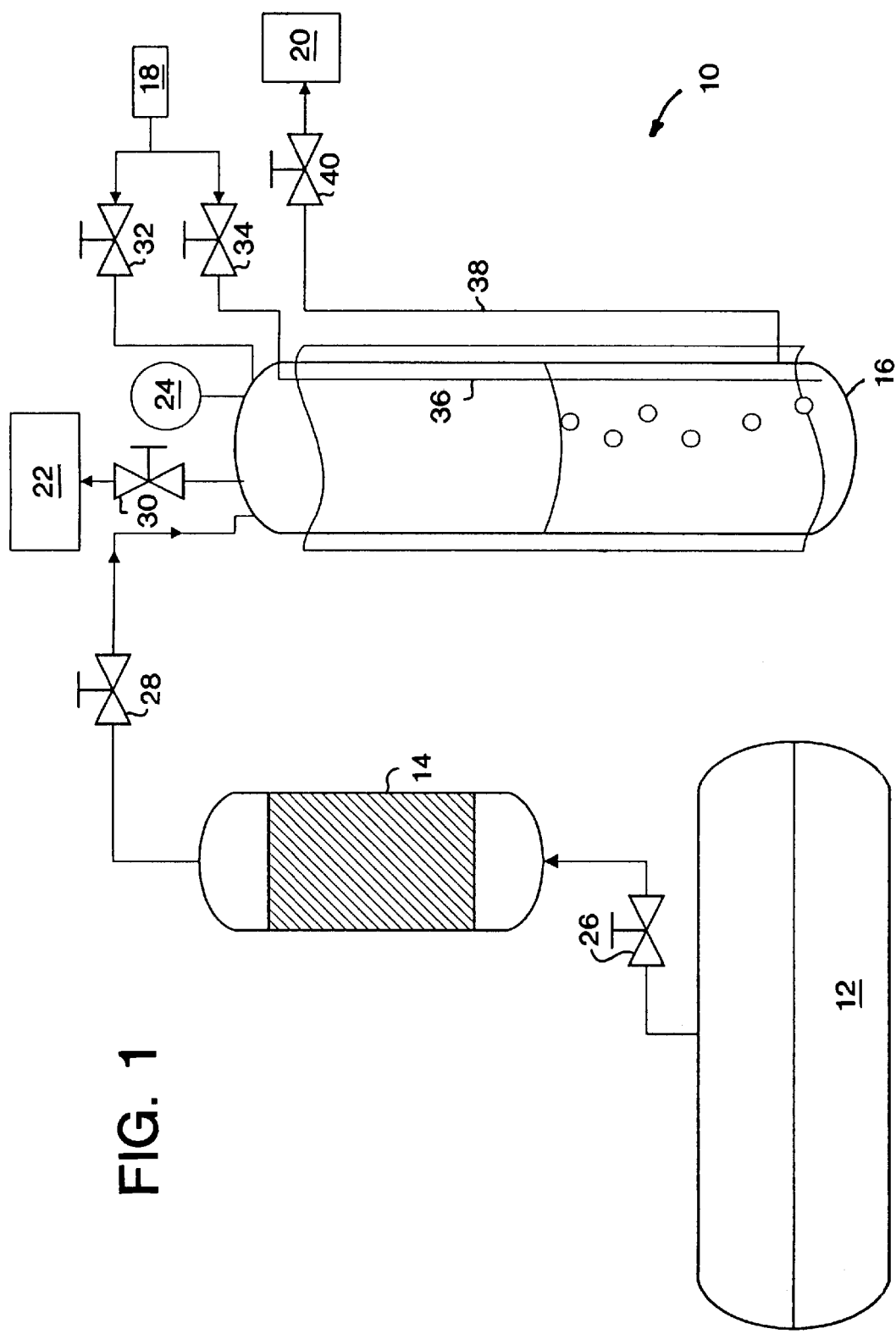
Figure 2:
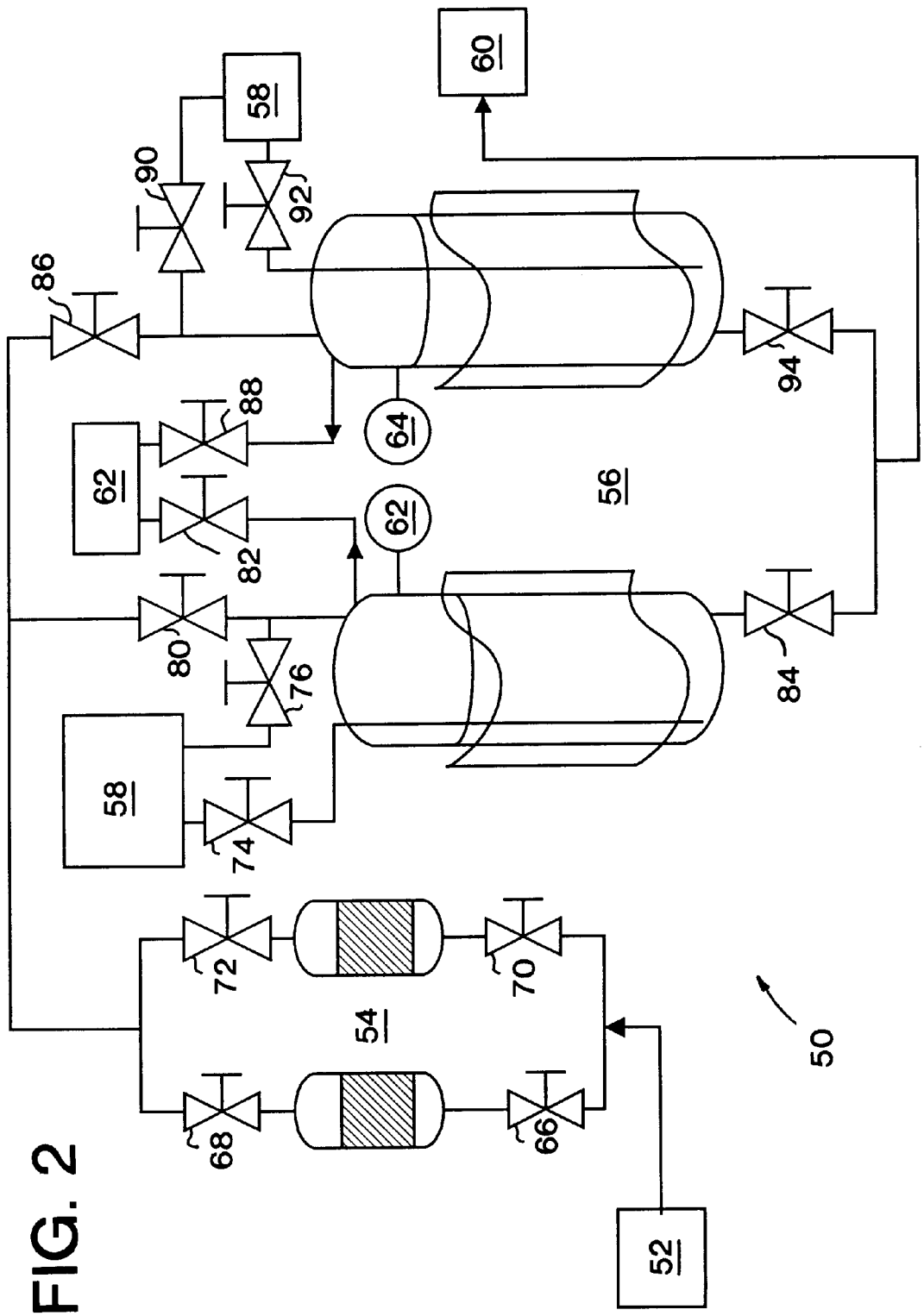

Other objects, features and advantages will occur to those skilled in the art from the following description of preferred embodiments and the accompanying drawings, in which:

FIG. 1 provides a schematic diagram of the semi-batch purification process for the production of tungsten hexafluoride in this invention; and FIG. 2 provides a schematic diagram of the continuous purification process for the production of tungsten hexafluoride in this invention.

DETAILED DESCRIPTION OF THE INVENTION

This invention is for producing UHP grade tungsten hexafluoride. The starting material is crude tungsten hexafluoride having 99+% purity which contains over about 1000 ppmv volatile impurities.

The purification system provides the complete removal of all the impurities from the crude tungsten hexafluoride to produce UHP grade tungsten hexafluoride. This system is significantly more efficient as compared to the disclosure of U.S. Pat. No. 5,324,498.

The purification system is more economical as compared to the distillation column approach. To separate hydrogen fluoride impurity in tungsten hexafluoride in a distillation column, a multiple trays distillation system is required due to the similarity in the boiling temperature between the two compounds. The sodium fluoride or potassium fluoride used in this invention is used for selectively removing hydrogen fluoride from tungsten hexafluoride. The material and preparation cost for the sodium trap is insignificant in comparison to multiple tray distillation column design.

The purification in this invention is based on a combination of evaporation, a gas phase reactive adsorption system and a sparging system. The evaporation is for removing the non-volatile residue from crude tungsten hexafluoride. The gas phase reactive adsorption bed is used to remove hydrogen fluoride and silicone fluoride impurities from tungsten hexafluoride. The sparging system is used for removing volatile impurities from the product. Each of such steps intended to remove a certain targeted impurities as shown in Table 1 below.

TABLE 1

| Compound | Typical Level In Crude | Purity Level Desired | Boiling Point (° C.) | Purification Step |
|---|---|---|---|---|
| CO2 | <100 ppm | <0.5 ppmv | −78.5 | sparging |
| CO | <100 ppm | <0.5 ppm | −191.5 | sparging |
| HF | <1000 ppm | <1.0 ppmv | 19.5 | Na trap |
| SH6 | <10 ppm | <0.5 ppmv | −63.7 | sparging |
| CF4 | <10 ppm | <0.5 ppmv | −128 | sparging |
| SiF4 | <1000 ppm | <0.5 ppmv | −65 | sparging/Na trap |
| N2 | <1000 ppm | <0.5 ppmv | −196 | sparging |
| O2 + Ar | <1000 ppm | <0.5 ppmv | −183 | sparging |
| Cr | <1000 ppbw | <5 ppbw | >900 | evaporation |
| Na | <1000 ppbw | <5 ppbw | >900 | evaporation |
| Fe | <1000 ppbw | <5 ppbw | >900 | evaporation |
| Th | <1000 ppbw | <0.1 ppbw | >900 | evaporation |
| K | <1000 ppbw | <5 ppbw | >900 | evaporation |
| U | <100 ppbw | <0.05 ppbw | >900 | evaporation |
| Other metals | <50,000 ppbw | <100 ppbw | >900 | evaporation |

The evaporation process is intended to separate non-volatile residue from tungsten hexafluoride. The non-volatile metallic residue has an insignificant vapor pressure under the temperature close to the boiling point temperature of tungsten hexafluoride. Insignificant amount of the non-volatile residue shall be transfilled along the gaseous product during the separation process.

The sparging system is used to remove volatile residue from tungsten hexafluoride. In the sparging system, helium gas is bubbled through liquid tungsten hexafluoride to drive the volatile impurities out of tungsten hexafluoride along with the helium. To reduce the amount of tungsten hexafluoride discharged along with helium, the tungsten hexafluoride is sparged at a temperature close to its melting point at 3° C. and the pressure of the vessel is kept at about 20 to 30 psia.

The reactive adsorption bed is used to remove hydrogen fluoride from tungsten hexafluoride. Hydrogen fluoride reacts at room temperature with sodium fluoride or potassium fluoride to form sodium bifluoride according to the following chemical reactions:

NaF (s)+HF (g)→NaHF$_2$ (s) (reaction 1)
KF (s)+HF (g)→KHF$_2$ (s) (reaction 2)

There is no reaction between sodium fluoride and potassium fluoride with tungsten hexafluoride. The gas phase transport also eliminates the possibility of leaching of the sodium fluoride or potassium fluoride impurities to the product stream.

FIG. 1 provides a schematic of the purification process of this invention for achieving UHP grade tungsten hexafluoride from 99% pure tungsten hexafluoride 10. The source cylinder of tungsten hexafluoride is stored in a pressure vessel 12. The temperature of the source vessel is kept at or slightly above the room temperature. The temperature should not be too high to avoid the possibility of tungsten hexafluoride condensation on the line and to completely avoid the transfil of non-volatile residue to the purified product.

The tungsten hexafluoride vapor is passed through valve 26 prior to the sodium fluoride (NaF) or potassium fluoride (KF) reactive adsorption bed 14 to remove the hydrogen fluoride impurities. The hydrogen fluoride impurity is stripped from the tungsten hexafluoride by reaction 1 or 2 (above) to produce non-volatile XHF$_2$ compound where X is sodium or potassium. The bed is also effective for removing silicon tetrafluoride (SiF$_4$) impurity from the product. Silicone tetrafluoride reacts with the alkaline fluoride to produce non-volatile solid according to the following formula:

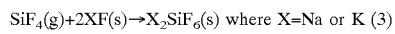
SiF$_4$(g)+2XF(s)→X$_2$SiF$_6$(s) where X=Na or K (3)

The tungsten hexafluoride sparging system vapor, which is free from the non-volatile residue, hydrogen fluoride and silicone hexafluoride, is flowed to valve 28 prior to a sparging system for final removal of the volatile residue. The sparging system is a temperature controlled nickel pressure vessel. The product is condensed to a nickel sparging vessel 16 by cooling the vessel to temperature below the melting point of tungsten hexafluoride, which is about 3° C. After the vapor has been transfilled to the sparging vessel 16, the temperature should be reset at just high enough to melt the product. Typically the preferable operation temperature must exceed 5° C.

Ultra high purity (UHP) helium gas 18 is used to sparge the tungsten hexafluoride to remove the non-volatile residue from the product. The helium is bubbled through the liquid tungsten hexafluoride. The bubbling action creates agitation and convection within the liquid tungsten hexafluoride, which enhances the evaporation of the volatile impurities. The volatile impurities are transferred to the gaseous phase and carried out along with the helium gas to the vent 22. To minimize the discharge of tungsten hexafluoride, the process must be carried out at temperature close to from about 3° C., and the pressure of the system is set at greater than 0.5 atm. The flow rate of helium is be controlled to a level that will not create excessive splashing of tungsten hexafluoride. Typically, the volatile impurities can be eliminated after more than ten times volume change in the head space of the vessel. UHP helium gas 18 passes through valve 32 at the top of sparging vessel 16, and through valve 34, via conduit 36, to the bottom of sparging vessel 16. UHP helium gas 38 is removed from sparging vessel 16 through conduit 38 to valve 40 prior to transfilling to container 20. Preferably, a vacuum is used to separate the non-volatile tungsten hexafluoride product or semicrude tungsten hexafluoride products from volatile impurities.

To minimize the tungsten hexafluoride lost, the sparging process is performed using a pulse purge sequence. After the vessel temperature is reduced to about 3° C., the cylinder is vented to atmospheric pressure. After valve 30 is closed, UHP helium is slowly flowed to the liquid tungsten hexafluoride by opening valve 34. The helium flow is stopped as soon as the pressure reading of the pressure transducer 24 reach 40 psia, by closing valve 34. The cylinder is vented to atmosphere pressure by opening valve 30. The procedure is repeated several times. At the end of the sparging, the product is then slowly heated to room temperature and ready to be packaged to a cylinder.

EXAMPLE I

Hydrogen Fluoride and Silicon Tetrafluoride purification from Tungsten Hexafluoride using Sodium Fluoride Each of hydrogen fluoride and silicon tetrafluoride was removed from the tungsten hexafluoride by passing the product through a sodium fluoride bed at room temperature. The flow rate of the tungsten hexafluoride was about 20 sccm and the bed was a stainless steel vessel with dimension of 1 inch OD, and the length of 5 inches. The bed was packed with 24 grams of sodium fluoride powder. The pressure of the vessel was held at atmospheric pressure. The product was analyzed through a 8 cm gas cell by a Fourier transform infrared spectrometer.

The result of the study showed that the concentration of hydrogen fluoride was reduced from about 100 ppm to less than about 5 ppm. The silicon tetrafluoride impurities was also reduced from about 100 ppm down to less than about 0.5 ppm.

EXAMPLE II
Sparging of Tungsten Hexafluoride to Remove Volatile Impurities

Trials were carried out to investigate the effectiveness of sparging system for removing volatile impurities. The tungsten hexafluoride product before and after the sparging process was analyzed for volatile impurities by gas chromatography.

The sparging experiments were carried out using one pound of 99% tungsten hexafluoride which contained nitrogen, carbon monoxide, hydrogen, carbon dioxide, oxygen/argon impurities at about 10 to about 1000 ppm. The sample was sparged using UHP helium at a rate of about 100 cc/min. About 20 times head space volume change occurred during the transfil process. The pressure of the vessel was above 20 psia. The result of the analysis is shown in Table 2 below. The temperature of the vessel was held at 3° C. The result convincingly shows effective removal of these impurities.

TABLE 2

| Impurities | Before Sparging | After Sparging |
| --- | --- | --- |
| $N_2$ | >1000 ppm | <1 ppm |
| $O_2$ + Ar | >100 ppm | <0.5 ppm |
| $H_2$ | >500 ppm | <0.5 ppm |
| CO | >10 ppm | <0.5 ppm |
| $CO_2$ | >10 ppm | <0.5 ppm |

This invention also contemplates that the order of the purification process may be reversed. The first step of the purification can be changed to the sparging step where the volatile impurities are removed from the product. The product is then evaporated to remove the heavy impurities. The vapor may then passed through the alkaline fluoride reactive bed to remove the hydrogen fluoride and the silicon tetrafluoride. The ultra high purity product may then be condensed to a collection vessel.

The sparging step may be changed with another procedure called the "head space rejection". This procedure involves vaporizing about five to about ten percent of the product mass from the source vessel to remove any light impurities.

This invention can also be used for continuous or semi-batch purification process. FIG. 2 shows a schematic flow diagram for the continuous purification system. This system consists of a set of sodium fluoride or potassium fluoride beds in parallel and the set of two sparging systems also in parallel. The configuration of two reactive beds in parallel allows continuous purification of hydrogen fluoride and silicone tetrafluoride. One of the two beds is used at one time. If the bed is saturated with hydrogen fluoride, the bed can either be activated by heating or replaced with a fresh alkaline fluoride bed. The alkaline by-fluoride by-products can be converted back to sodium fluoride and hydrogen fluoride by purging the bed with helium or other inert gas at from about 300° C. to about 350° C. The hydrogen fluoride is removed from the bed along with the purge gas.

This configuration allows continuous purification process. The rate-determining step in the production process is typically the vapor transfil/condensation step. In the two sparging configuration, while one container is being used for filling the vessel, the sparging or liquid product transfil can be carried out in the other cylinder.

FIG. 2 provides a schematic diagram of a tungsten hexafluoride continuous purification process 50. Crude vapor tungsten hexafluoride 52 (about 99% purity) passes through valve 66 and/or valve 70 to a dual fluidized bed arrangement 54 and passes out through valve 68 and/or valve 72. The tungsten hexafluoride gas then passes through valve 80 and/or valve 86 to a dual sparging system 56. Pressure sensors 62 and 64 are placed on the dual sparging system 56. A dual UHP helium system 58 enable the helium to flow through valve 76 to combine with the tungsten hexafluoride valve 80 and/or to flow through valve 90 to combine with the tungsten hexafluoride from valve 80, and fed into the sparging system 56. Separately, the UHP helium 58 is fed through valve 74 and/or valve 92 to the bottom of the sparger system 56. The UHP tungsten hexafluoride product 60 is removed from the sparger system 56 through valve 84 and/or valve 94. Valves 82 and 88 regulate the volatile impurities from the top of dual sparger system 56, and passes to vent 96.

The efficiency of the sparging process for removing hydrogen fluoride is not as good as the other gases due to the similarity in the vapor pressure between hydrogen fluoride and tungsten hexafluoride. However, the hydrogen fluoride may be removed to less than 5 ppm from 1000 ppm after about more than 60 times head space volume changes. This is about 6 times longer than what is required for removing other volatile impurities and results in large product lost.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for producing UHP tungsten hexafluoride comprising:
   a) introducing an amount of crude tungsten hexafluoride to an evaporating process for separation into an amount of tungsten hexafluoride-containing volatile impurities and an amount of non-volatile metallic impurities;
   b) passing said amount of tungsten hexafluoride-containing volatile impurities to a gas phase adsorption process for separation into an amount of semi-crude tungsten hexafluoride product and an amount of hydrogen fluoride as adsorbed residue; and
   c) passing said amount of semi-crude tungsten hexafluoride product to a UHP gas sparging system for separation into a non-volatile UHP tungsten hexafluoride product.

2. The method of claim 1 further comprising providing a vacuum to separate said non-volatile UHP tungsten hexafluoride product.

3. The method of claim 1 wherein said crude tungsten hexafluoride contains greater than about 1 ppmv hydrogen fluoride impurities.

4. The method of claim 1 wherein said amount of tungsten hexafluoride-containing volatile impurities in step b) is also separated into an amount of non-volatile silicone fluoride impurities.

5. The method of claim 1 wherein said sparging system in step 1c) is carried out at a temperature of greater than about 3° C., and at a pressure of greater than 0.5 atm.

6. The method of claim 1 wherein said sparging system in step 1c) uses a pulse purge sequence.

7. The method of claim 1 wherein said gas phase adsorption process uses a sodium fluoride adsorption bed.

8. The method of claim 1 wherein said gas phase adsorption process uses a potassium fluoride adsorption bed.

9. The method of claim 1 wherein said UHP gas sparging system uses an inert gas selected from the group consisting of argon, nitrogen, helium, krypton and xenon.

10. A method for removing hydrogen fluoride from tungsten hexafluoride comprising:
   a) passing an amount of crude tungsten hexafluoride to a gas phase adsorption process for separation into an amount of semi-crude tungsten hexafluoride product and an amount of hydrogen fluoride as adsorbed residue; and
   b) passing said amount of semi-crude tungsten hexafluoride product to a UHP gas sparging system using UHP helium for separation into a non-volatile UHP tungsten hexafluoride product.

11. The method of claim 10 wherein said amount of tungsten hexafluoride in step 10a) is also separated into an amount of non-volatile silicon fluoride impurities.

12. The method of claim 10 wherein said sparging system in step 10b) is carried out at a temperature of greater than about 3° C., and at a pressure of greater than about 0.5 atm.

13. The method of claim 10 wherein said sparging system in step 10b) uses a pulse purge sequence.

14. The method of claim 10 wherein said gas phase adsorption process uses a sodium fluoride adsorption bed.

15. The method of claim 11 wherein said gas phase adsorption process uses a potassium fluoride adsorption bed.

16. A method for producing UHP tungsten hexafluoride comprising:
   a) introducing an amount of crude tungsten hexafluoride to an evaporating process for separation into an amount of tungsten hexafluoride-containing volatile impurities and an amount of metallic impurities;
   b) passing said amount of tungsten hexafluoride-containing volatile impurities to a gas phase adsorption process for separation into an amount of semi-crude tungsten hexafluoride product and an amount of hydrogen fluoride non-volatile impurities; and
   c) vaporizing under vacuum condition said semi-crude hexafluoride product to remove an amount of said volatile impurities.

17. The method of claim 16 wherein said crude tungsten hexafluoride contains greater than about 1 ppmv hydrogen fluoride impurities.

18. The method of claim 16 wherein said amount of tungsten hexafluoride-containing volatile impurities in step 16b) is also separated into an amount of non-volatile silicone fluoride impurities.

19. The method of claim 16 wherein said gas phase adsorption process uses a sodium fluoride adsorption bed.

20. The method of claim 16 wherein said gas phase adsorption process uses a potassium fluoride adsorption bed.

* * * * *